United States Patent
Rodriguez Erdmenger et al.

(10) Patent No.: US 10,968,762 B2
(45) Date of Patent: Apr. 6, 2021

(54) SEAL ASSEMBLY FOR A TURBO MACHINE (71) Applicant: General Electric Company, Schenectady, NY (US)

(72) Inventors: Rodrigo Rodriguez Erdmenger, Munich (DE); Nathan Evan McCurdy Gibson, West Chester, OH (US); Quang Tue Nguyen Tran, Munich (DE); Antonio Guijarro Valencia, Munich (DE)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/194,673

(22) Filed: Nov. 19, 2018

(65) Prior Publication Data
US 2020/0157961 A1 May 21, 2020

(51) Int. Cl.
*F01D 11/02* (2006.01)
*F01D 11/00* (2006.01)
*F01D 11/06* (2006.01)

(52) U.S. Cl.
CPC .......... *F01D 11/025* (2013.01); *F01D 11/001* (2013.01); *F01D 11/06* (2013.01); *F05D 2240/55* (2013.01)

(58) Field of Classification Search
None
See application file for complete search history.

(56) References Cited

U.S. PATENT DOCUMENTS

| | | | | |
|---|---|---|---|---|
| 3,912,342 A | * | 10/1975 | Schirm | F01D 11/003 384/131 |
| 4,080,120 A | * | 3/1978 | Eiermann | F01C 19/08 277/357 |
| 5,056,935 A | * | 10/1991 | Singh | F01D 25/164 384/99 |
| 5,127,660 A | * | 7/1992 | Maier | F16J 15/441 277/422 |
| 5,375,852 A | * | 12/1994 | Charhut | F16J 15/3404 277/371 |
| 5,505,588 A | * | 4/1996 | Bruhwiler | F01D 9/065 415/112 |
| 5,729,979 A | * | 3/1998 | Shaw | B60T 7/042 60/533 |
| 6,676,369 B2 | | 1/2004 | Brauer et al. | |
| 6,758,477 B2 | | 7/2004 | Brauer et al. | |
| 7,066,470 B2 | | 6/2006 | Turnquist et al. | |
| 7,797,941 B2 | | 9/2010 | Munsell et al. | |

(Continued)

FOREIGN PATENT DOCUMENTS

WO WO2018/022314 A1 2/2018

*Primary Examiner* — Michael Lebentritt
(74) *Attorney, Agent, or Firm* — Dority & Manning, P.A.

(57) ABSTRACT

An aspect of the present disclosure is directed to a seal assembly for a turbo machine. The seal assembly includes a fluid bearing wall including a bearing face in which the bearing face defines a fluid opening through the fluid bearing wall. The seal assembly further includes a seal body extended circumferentially relative to a centerline axis. The seal body defines a cavity extended at least partially circumferentially through the seal body. A fluid passage is defined through the seal body in fluid communication with the fluid opening through the fluid bearing wall.

20 Claims, 4 Drawing Sheets

(56) References Cited

U.S. PATENT DOCUMENTS

| | | | |
|---|---|---|---|
| 8,087,881 B1* | 1/2012 | Cardoso, III | F01D 5/26 |
| | | | 415/119 |
| 8,109,717 B2 | 2/2012 | Glahn et al. | |
| 8,490,980 B2 | 7/2013 | Wright et al. | |
| 8,888,441 B2 | 11/2014 | Jordy et al. | |
| 8,919,781 B2 | 12/2014 | Justak | |
| 9,097,350 B2 | 8/2015 | Dale | |
| 9,255,642 B2 | 2/2016 | Bidkar et al. | |
| 9,291,067 B2 | 3/2016 | Zheng et al. | |
| 9,394,799 B1 | 7/2016 | Mills et al. | |
| 9,732,621 B1 | 8/2017 | Sexton et al. | |
| 9,976,420 B2 | 5/2018 | Tran et al. | |
| 10,156,159 B1* | 12/2018 | Ganiger | F01D 25/164 |
| 2003/0011135 A1* | 1/2003 | Meacham | F16J 15/3404 |
| | | | 277/408 |
| 2004/0201176 A1* | 10/2004 | Bjornson | F16J 15/3488 |
| | | | 277/370 |
| 2005/0116425 A1* | 6/2005 | Blatchford | F01D 11/02 |
| | | | 277/412 |
| 2005/0194783 A1* | 9/2005 | Ebskamp | G01F 15/185 |
| | | | 285/124.5 |
| 2010/0066024 A1* | 3/2010 | Burdgick | F01D 11/001 |
| | | | 277/301 |
| 2012/0195741 A1* | 8/2012 | Sarawate | F01D 11/001 |
| | | | 415/170.1 |
| 2014/0062032 A1* | 3/2014 | Wolfe | F16J 15/128 |
| | | | 277/590 |
| 2017/0314409 A1* | 11/2017 | Erdmenger | F01D 11/04 |

* cited by examiner

SEAL ASSEMBLY FOR A TURBO MACHINE

FIELD

The present subject matter relates generally to seal assemblies. The present subject matter more specifically relates to generally non-contacting seal assemblies for turbo machines.

BACKGROUND

Non-contact seals, such as aspirating face seals, may be included between static and rotating components of gas turbine engines to provide a fluid bearing surface between a static structure and a rotor assembly. Such seals may operate at relatively tight clearances without contacting the rotor assembly, thus providing relatively little wear.

However, under certain operating conditions of the rotor assembly and the turbo machine, insufficient or transient changes in flow providing the fluid bearing at the seal assembly may result in contact at the rotor assembly, or other damage, deflection, or deformation at the seal assembly.

As such, there is a need for an improved seal assembly that improves seal assembly performance, durability, and mitigates damage due to rotor assembly contact or seal assembly deflection.

BRIEF DESCRIPTION

Aspects and advantages of the invention will be set forth in part in the following description, or may be obvious from the description, or may be learned through practice of the invention.

An aspect of the present disclosure is directed to a seal assembly for a turbo machine. The seal assembly includes a fluid bearing wall including a bearing face in which the bearing face defines a fluid opening through the fluid bearing wall. The seal assembly further includes a seal body extended circumferentially relative to a centerline axis. The seal body defines a cavity extended at least partially circumferentially through the seal body. A fluid passage is defined through the seal body in fluid communication with the fluid opening through the fluid bearing wall.

In various embodiments, the fluid opening at the fluid bearing wall defines a first cross sectional area and the fluid passage defines a second cross sectional area different from the first cross sectional area at the fluid opening. In one embodiment, the second cross sectional area is greater than the first cross sectional area. In another embodiment, a ratio of the second cross sectional area at the fluid passage to the first cross sectional area at the fluid opening is between 1.1:1 and 3:1.

In still various embodiments, the seal assembly further includes a spring member coupled to the seal body and the fluid bearing wall, in which the spring member is disposed between the seal body and the fluid bearing wall. The fluid passage is defined through the spring member, the seal body, and the fluid bearing wall in fluid communication with the fluid opening through the fluid bearing wall. In one embodiment, the fluid passage defines a serpentine volume through the spring member. In another embodiment, the seal body is integrally formed with the spring member, and the seal body and the spring member together define a unitary structure.

In still yet various embodiments, the cavity is defined radially outward, radially inward, or both, relative to the fluid passage at the seal body. In one embodiment, the seal body includes a plurality of ribs extended through the cavity. In another embodiment, the plurality of ribs is integrally attached to the seal body between a first portion of the seal body extended opposite of a second portion of the seal body. In still another embodiment, the plurality of ribs includes an axial rib extended substantially co-directional to the centerline axis. In yet another embodiment, the plurality of ribs includes a radial rib extended substantially perpendicular or oblique to the centerline axis.

Another aspect of the present disclosure is directed to a turbo machine including a rotor assembly including a rotor face rotatable relative to a centerline axis, a stator structure adjacent to the rotor assembly, and a seal assembly attached to the stator structure. The seal assembly includes a fluid bearing wall including a bearing face. The bearing face and the rotor face together define a bearing fluid passage between the rotor face and the bearing face. The bearing face defines a fluid opening through the fluid bearing wall in fluid communication with the bearing fluid passage. The seal assembly further includes a seal body extended circumferentially relative the centerline axis. The seal body defines a cavity extended at least partially circumferentially through the seal body. A spring member is attached to the seal body and the fluid bearing wall. A fluid passage is defined through the spring member and the fluid bearing wall in fluid communication with the fluid opening at the fluid bearing wall.

In various embodiments, the fluid opening at the fluid bearing wall defines a first cross sectional area directly adjacent to the bearing fluid passage, and the fluid passage through at least the spring member defines a second cross sectional area different from the first cross sectional area at the fluid bearing wall. In one embodiment, the second cross sectional area is greater than the first cross sectional area. In another embodiment, a ratio of the second cross sectional area at the fluid passage to the first cross sectional area at the fluid opening is between 1.1:1 and 3:1.

In still various embodiments of the turbo machine, the seal body of the seal assembly is integrally formed with the stator structure, and wherein the seal body and the stator structure together define a unitary structure. In one embodiment, the seal body is integrally formed with the spring member, and the seal body and the spring member together define a unitary structure.

In still yet various embodiments, the cavity is defined radially outward, radially inward, or both, relative to the fluid passage at the seal body. In one embodiment, the seal body includes a plurality of ribs attached to the seal body and extended through the cavity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of an improved seal assembly that improves seal assembly performance, durability, and mitigates damage due to rotor assembly contact or seal assembly deflection are generally provided. The seal assembly includes a fluid bearing wall defining a bearing face through which a fluid opening is defined. The seal assembly further includes a seal body defining a cavity extended at least partially circumferentially through the seal body, such as to reduce weight and improve seal assembly efficiency and performance. The cavity may further define a plurality of ribs therein to provide structural rigidity and durability. A fluid passage is defined through the seal body in fluid communication with the fluid opening through the fluid bearing wall. A failsafe device is further defined at the fluid opening and the fluid passage such as to limit the pressure drop between the bearing face and the rotor assembly, such as to provide a minimum flow to the clearance therebetween to ensure a fluid bearing is sufficiently formed.

Figure 1:
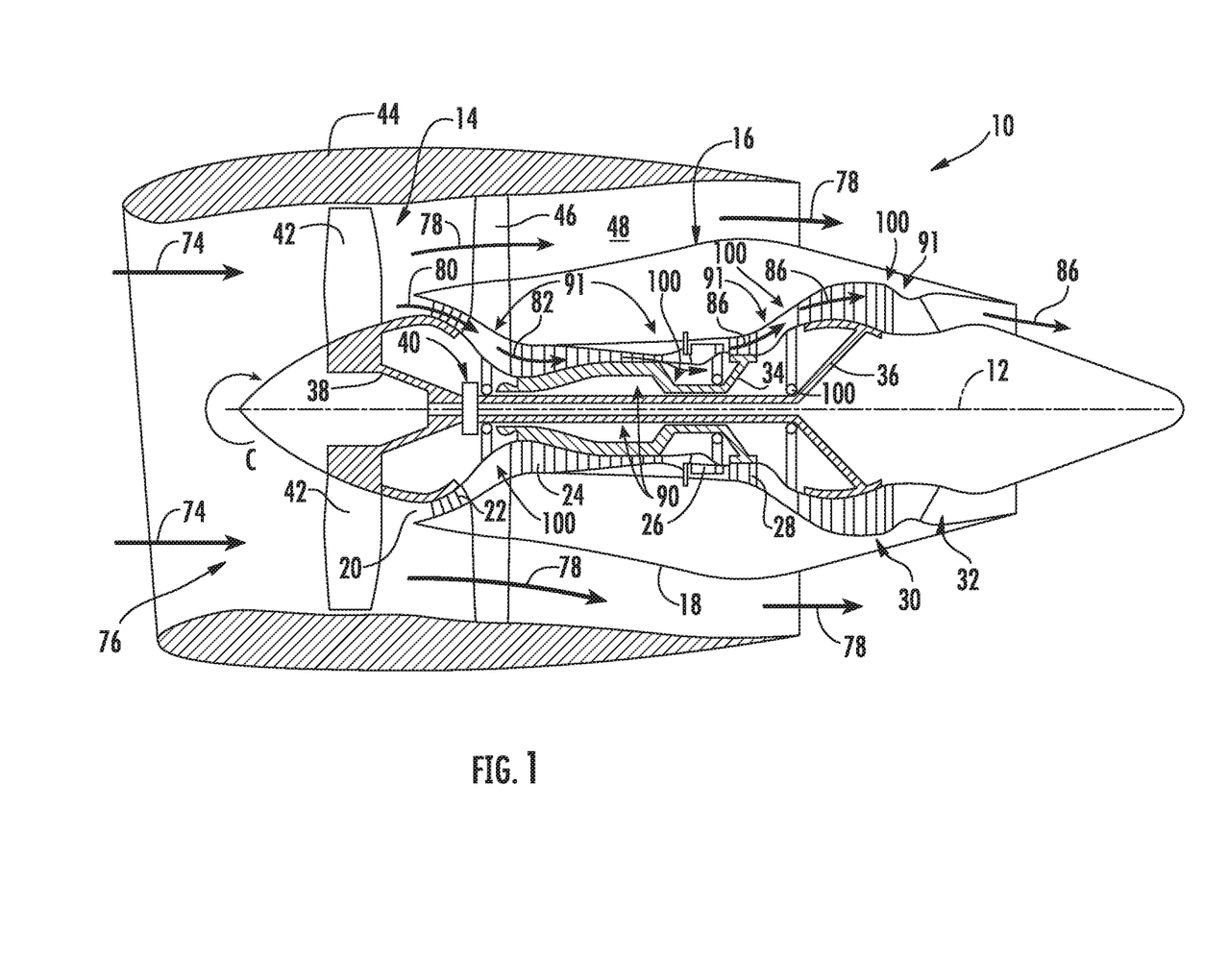
FIG. 1 is an exemplary embodiment of a turbo machine including an exemplary seal assembly according to an aspect of the present disclosure.

Referring now to the drawings, FIG. 1 is a schematic partially cross-sectioned side view of an exemplary turbo machine 10 herein referred to as "engine 10" as may incorporate various embodiments of the present disclosure. Although further described below with reference to a gas turbine engine, the present disclosure is also applicable to bearing assemblies and turbomachinery in general, including turbofan, turbojet, turboprop, and turboshaft gas turbine engines, including marine and industrial turbine engines and auxiliary power units, steam turbine engines, or other rotary machines that include bearing assemblies. As shown in FIG. 1, the engine 10 has a longitudinal or axial engine centerline axis 12 that extends there through for reference purposes. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure compressor and turbine rotatable with an intermediate pressure shaft altogether defining a three-spool gas turbine engine.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

During operation of the engine 10, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26, such as depicted schematically by arrows 82. The compressed air 82 flows into the combustion section 26.

The compressed air 82 is mixed with a liquid and/or gaseous fuel and burned, thus generating combustion gases, as indicated schematically by arrows 86, within the combustion section 26. The combustion gases 86 flow downstream and expand at the HP turbine 28 and the LP turbine 30 to drive the respective HP compressor 24 and LP compressor 22 attached thereto.

Referring still to FIG. 1, the combinations of the HP compressor 24, the HP shaft 34, and the HP turbine 28, or the LP compressor 22, the LP shaft 36, and the LP turbine 30, may define a rotor assembly 90 of the engine 10. In other embodiments, such as described above, the rotor assembly 90 may include combinations of the intermediate compressor, intermediate shaft, and intermediate turbine. In still various embodiments, the engine 10 includes a static structure 91, such as, but not limited to, the outer casing 18, or another casing, generally supporting rotation of the rotor assembly 90. A seal assembly 100 is included at the static structure 91 and directly adjacent to the rotor assembly 90, such as depicted in various embodiments in regard to FIGS. 2-7 below.

Figure 2:
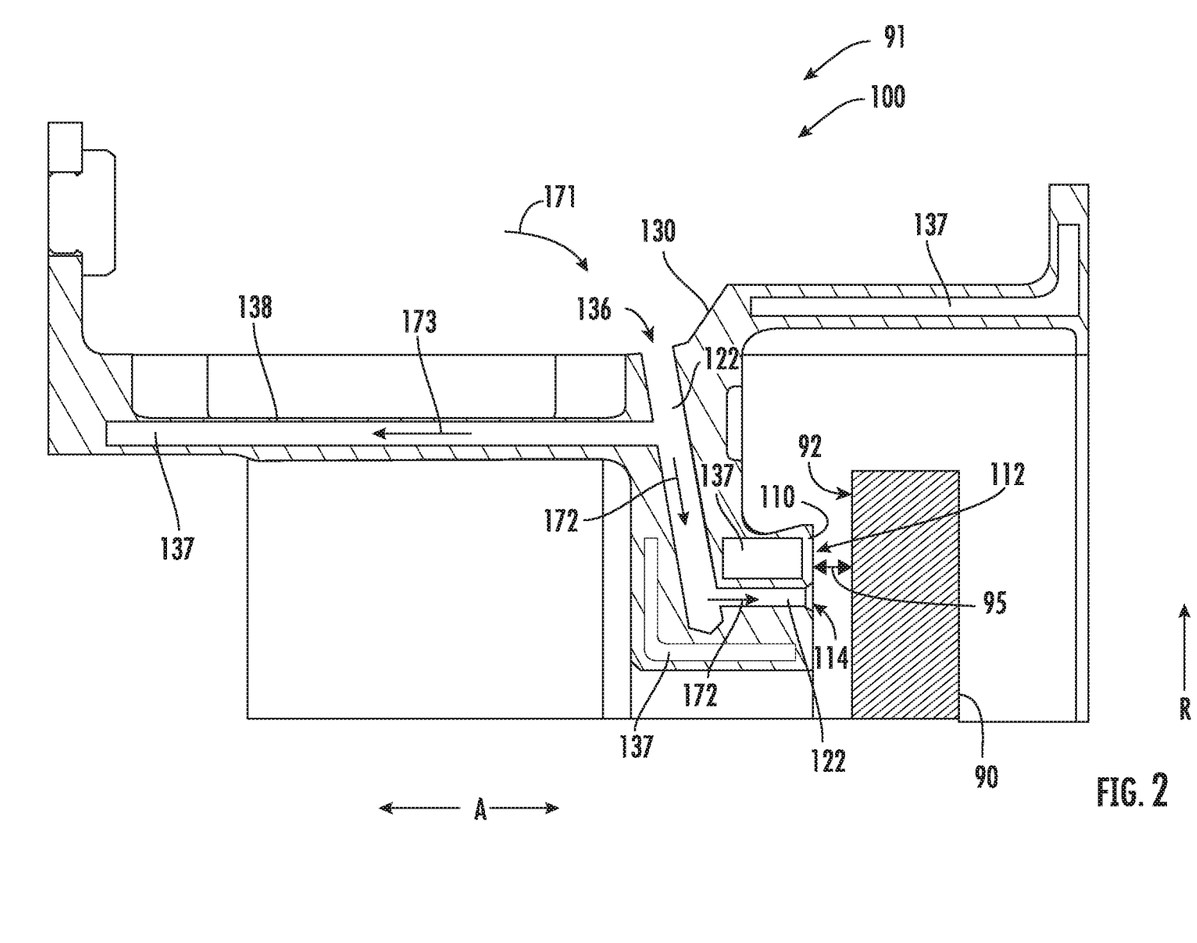
FIG. 2 is a cross sectional side view of an exemplary embodiment of a seal assembly according to an aspect of the present disclosure.

Referring now to FIG. 2, a cross sectional side view of an exemplary embodiment of the seal assembly 100 is generally provided. The seal assembly 100 includes a fluid bearing wall 110 defining a bearing face 112. The bearing face 112 defines a fluid opening 114 through the fluid bearing wall 110 in fluid communication with a clearance 95 between the bearing face 112 and a rotor face 92 of the rotor assembly 90. The seal assembly 100 further includes a seal body 130 extended circumferentially relative to the centerline axis 12 (FIG. 1).

Figure 3:
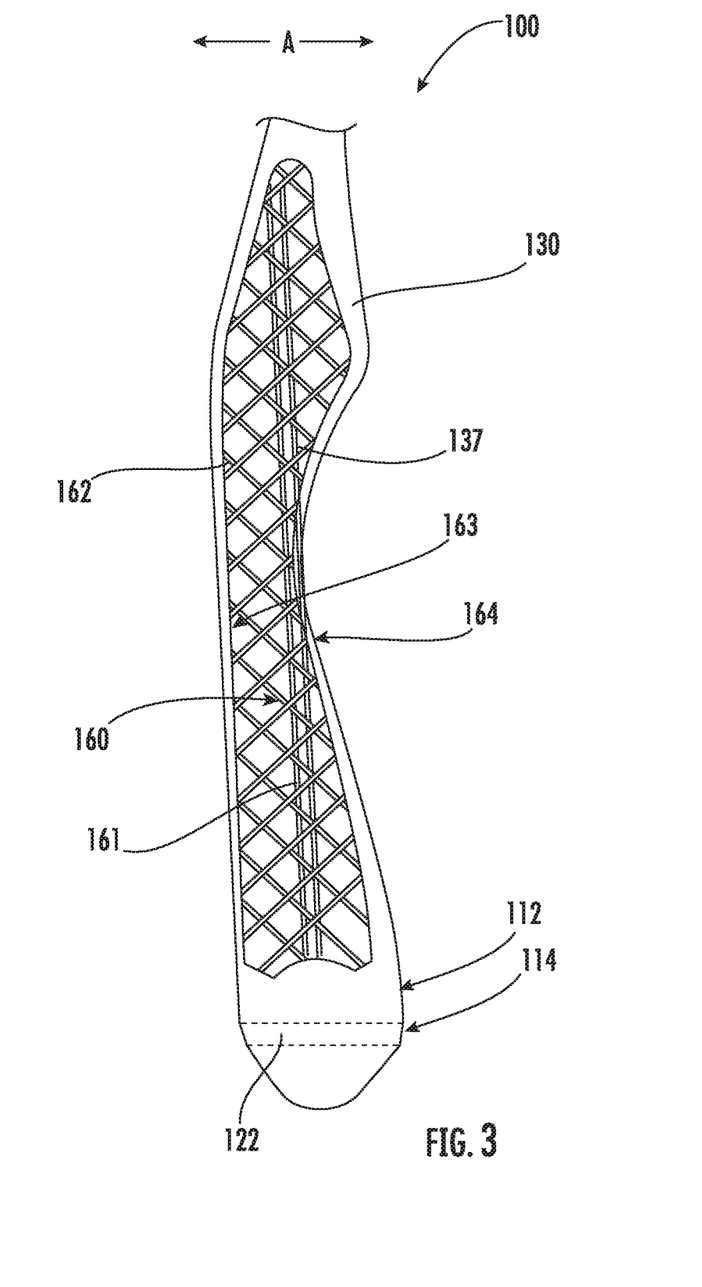
FIG. 3 is a detailed cross sectional side view of a portion of the seal assembly of FIG. 2.

Referring to FIGS. 2-3, the seal body 130 defines a cavity 137 extended at least partially circumferentially through the seal body 130. In various embodiments, the cavity 137 is defined outward along the radial direction R relative to the fluid passage 122 at the seal body 130. In other embodiments, the cavity 137 is additionally, or alternatively, defined inward along the radial direction R relative to the fluid passage 122 at the seal body 130. A fluid passage 122 is defined through the seal body 130 in fluid communication with the fluid opening 114 through the fluid bearing wall 110.

Referring to FIGS. 1-2, during operation of the engine 10, a flow of fluid from the gas path, such as from the fan assembly 14 and/or the compressors 22, 24 is directed to the seal assembly 100 via manifolds or conduits. The flow of fluid, depicted in regard to FIG. 2 via arrows 171, enters the fluid passage 122 at the seal body 130 via a fluid inlet opening 136. At least a portion of the fluid, depicted via arrows 172, egresses into the clearance 95 between the rotor assembly 90 and the bearing face 112 via the fluid opening 114, such as to define a fluid bearing therebetween. In various embodiments, a portion of the fluid, depicted via arrows 173, may flow through a portion 138 of the fluid passage 122 extended through an axially extended cross bar of the seal body 130, such as to provide thermal attenuation that may minimize deformations such as coning during one or more transient operating conditions of the engine 10 (e.g., changes in flow rate, pressure, and/or temperature of the fluid 171 entering the seal body 130).

Referring now to a portion of an exemplary embodiment of the seal assembly 100 depicted in FIG. 3, and in conjunction with FIG. 2, the seal body 130 includes a plurality of ribs 160 extended through the cavity 137. The cavity 137 improves seal assembly 100 and engine 10 performance and efficiency, such as to reduce weight and improve thrust output. The plurality of ribs 160 further improves durability, structural integrity, and performance of the seal assembly 100.

In various embodiments, the plurality of ribs 160 is integrally attached to the seal body 130 between a first portion 163 of the seal body 130 extended opposite of a second portion 164 of the seal body 130. For example, the first portion 163 of the seal body 130 is separated along the axial direction A from the second portion 164, in which the cavity 137 is defined therebetween. In one embodiment, the plurality of ribs 160 includes an axial rib 162 extended substantially along the axial direction A, such as generally co-directional to the centerline axis 12 (FIG. 1). In another embodiment, the plurality of ribs 160 includes a radial rib 161 extended substantially perpendicular or oblique to the centerline axis 12, such as generally perpendicular or oblique relative to the axial direction A.

In various embodiments, the cavity 137 enables relatively hot air to enter the seal body 130 such as to provide a more even thermal transient response to the seal body 130 and surrounding structure. The more even thermal transient response may improve seal assembly 100 performance and overall performance and operation of the engine 10 by enabling substantially even thermal transfer circumferentially and/or radially through the seal body 130. As such, the cavity 137 may mitigate distortions and performance losses due to uneven clearances, gaps, or openings relative to the rotor assembly 90. Additionally, or alternatively, improved thermal transient response may improve operating clearances and tolerances at the engine 10 that affect performance and operability of the engine 10.

Figure 4:
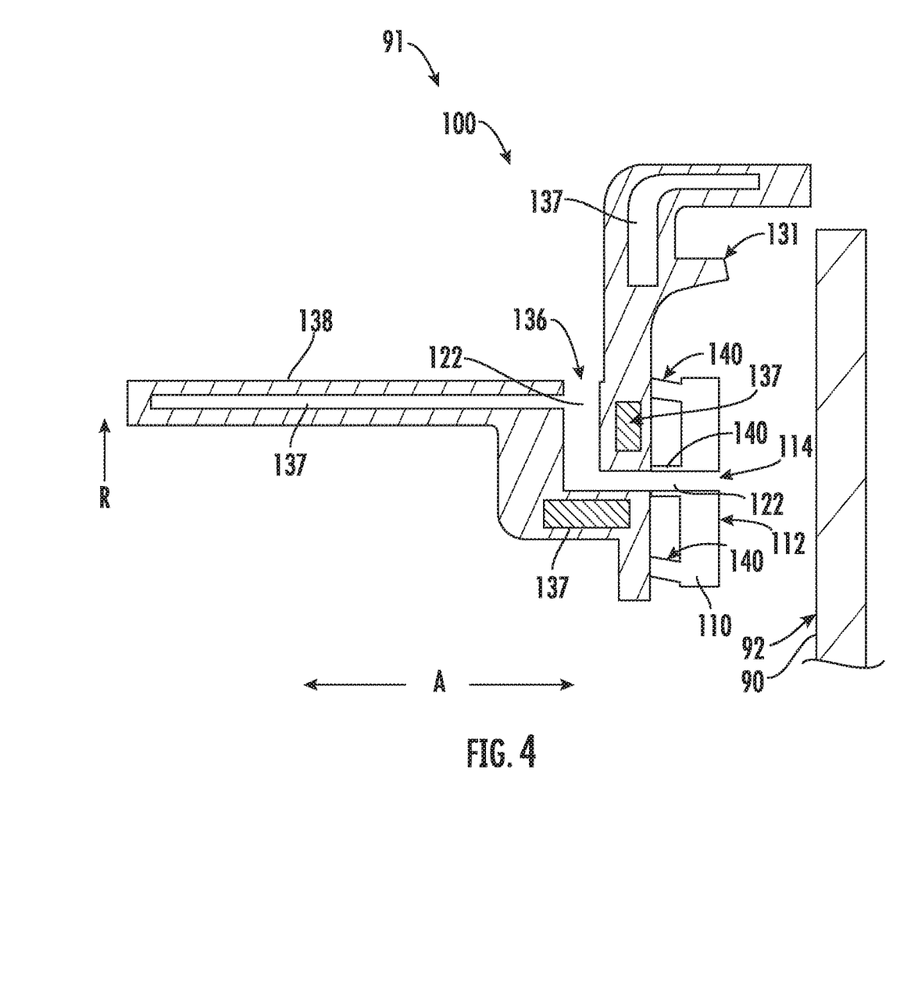
FIG. 4 is a cross sectional perspective view of an exemplary embodiment of the seal assembly according to an aspect of the present disclosure.

Referring now to FIG. 4, the exemplary embodiment of the seal assembly 100 provided is configured substantially similarly as shown and described in regard to FIGS. 1-3. In various embodiments, the seal assembly 100 further includes a spring member 140 coupled to the seal body 130 and the fluid bearing wall 110. The spring assembly 140 is disposed between the seal body 130 and the fluid bearing wall 110. The fluid passage 122 is defined through the spring member 140, the seal body 130, and the fluid bearing wall 110 in fluid communication with the fluid opening 114 through the fluid bearing wall 110. In various embodiments, the fluid passage 122 is more particularly in direct fluid communication through the seal body 130, the spring member 140, and the fluid bearing wall 110 with the fluid opening 114 and the clearance 95 between the rotor assembly 90 and the bearing face 112. In still various embodiments, the seal body 130 is integrally formed with the spring member 140 such as to define the spring member 140 and the seal body 130 together as a unitary, monolithic structure.

Figure 5:
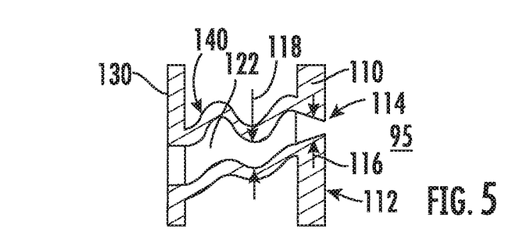
FIGS. 5-6 are detailed cross sectional side views of exemplary embodiments of a portion of the seal assembly according to aspects of the present disclosure.
Figures 6, 7, 8:
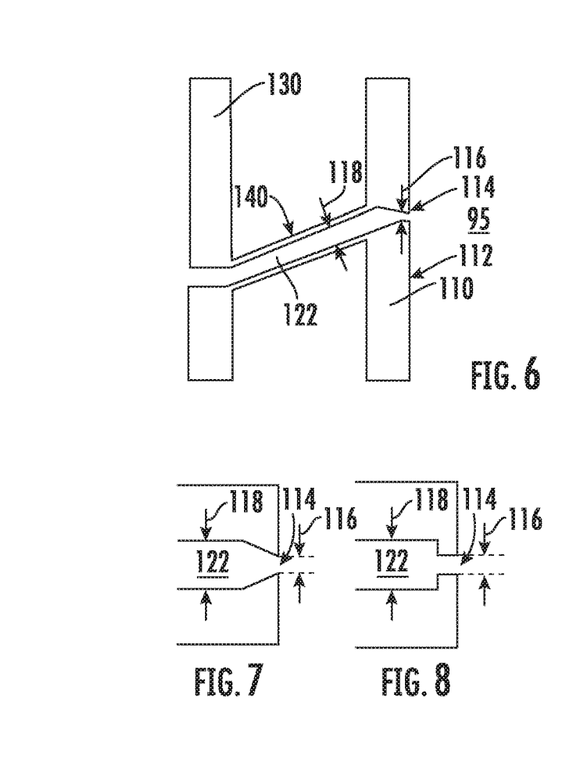
FIGS. 7-8 are detailed cross sectional side views of exemplary embodiments of a portion of the seal assembly according to aspects of the present disclosure.

Referring now to FIG. 5, a detailed view of a portion of the seal assembly 100 is generally provided such as configured as described in regard to FIG. 4. The embodiment depicted in FIG. 5 further depicts the spring member 140 as defining a serpentine or waveform spring structure, such as to enable movement along the axial direction A (FIG. 4) based on changes in operating condition of the engine 10 (e.g., changes in pressure, temperature, flow rate, etc. of fluid through the fluid passage 122 and at the fluid bearing defined at the clearance 95). The serpentine or waveform spring structure of the spring member 140 may further define the fluid passage 122 as a generally serpentine volume through the spring member 140.

Referring to FIGS. 5-8, in various embodiments, the seal assembly 100 defines a failsafe device such as to limit the pressure drop defining a fluid bearing at the clearance 95 between the bearing face 112 and the rotor face 92. The failsafe device includes the fluid opening 114 at the fluid bearing wall 110 defining a first cross sectional area 116 and the fluid passage 122 defining a second cross sectional area 118 different from the first cross sectional area 116. The second cross sectional area 118 at the fluid passage 122 is greater than the first cross sectional area 116 at the fluid opening 114 such as to limit the pressure drop at the clearance 95 between the bearing face 112 and the rotor face 92 of the rotor assembly 90. In various embodiments, a ratio of the second cross sectional area 118 at the fluid passage 122 to the first cross sectional area 116 at the fluid opening 114 is between 1.1:1 and 3:1 (i.e., the second cross sectional area 118 between 1.1. times and 3 times greater than the first cross sectional area 116), such as to provide sufficient flow at the plurality of operating conditions of the engine 10 while mitigating excessive pressure loss during adverse flow conditions through the fluid passage 122.

Referring now to FIGS. 1-8, various embodiments of the seal body 130, and the fluid bearing wall 110 are extended circumferentially relative to the axial centerline axis 12 (FIG. 1) of the engine 10. In one embodiment, the fluid bearing wall 110, the seal body 130, the spring member 140, or combinations thereof, may define separate or detachable segments in circumferential arrangement. In still various embodiments, one or more of the clearances 95, passages 122, cavities 137, etc. defined by the fluid bearing wall 110, the seal body 130, or the spring member 140, or combinations thereof, may be extended along the circumferential direction.

It should be appreciated that various embodiments of the fluid passage 122, the fluid opening 114, the fluid feed opening 136, the fluid feed passage 138, or combinations thereof, may define discrete openings e.g., one or a plurality of openings defined therethrough such as to provide desired pressure drops, differentials, losses, deltas, etc. such as to define a desired fluid bearing between the rotor assembly 90 and the fluid bearing wall 110 relative to one or more operating conditions of the engine 10.

Still various embodiments of the seal assembly 100 generally provided herein may be manufactured via one or more processes known as additive manufacturing or 3D printing. Still other embodiments may additionally or alternatively manufacture the seal assembly 100 via one or more machining, forging, casting, or joining processes, including, but not limited to, welding, brazing, soldering, friction bonding, or adhesives, or mechanical fasteners (e.g., nuts, bolts, screws, tie rods, pins, etc.), other appropriate joining mechanisms or methods.

Embodiments of the seal assembly 100 shown and described herein may substantially define an aspirating face seal assembly or other appropriate generally non-contacting seal assembly configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A seal assembly for a turbo machine, the seal assembly comprising:
    a fluid bearing wall comprising a bearing face, wherein the bearing face defines a fluid opening through the fluid bearing wall; and
    a seal body extended circumferentially relative a centerline axis, wherein the seal body defines a cavity extended at least partially circumferentially through the seal body, wherein a fluid passage is defined through the seal body in fluid communication with the fluid opening through the fluid bearing wall, and wherein the cavity is in fluid isolation from the fluid passage.

2. The seal assembly of claim 1, wherein the fluid opening at the fluid bearing wall defines a first cross sectional area, and wherein the fluid passage defines a second cross sectional area different from the first cross sectional area.

3. The seal assembly of claim 2, wherein the second cross sectional area is greater than the first cross sectional area.

4. The seal assembly of claim 3, wherein a ratio of the second cross sectional area at the fluid passage to the first cross sectional area at the fluid opening is between 1.1:1 and 3:1.

5. The seal assembly of claim 1, further comprising:
    a spring member coupled to the seal body and the fluid bearing wall and disposed therebetween, wherein the fluid passage is defined through the spring member, the seal body, and the fluid bearing wall in fluid communication with the fluid opening through the fluid bearing wall.

6. The seal assembly of claim 5, wherein the fluid passage defines a serpentine volume through the spring member.

7. The seal assembly of claim 5, wherein the seal body is integrally formed with the spring member, and wherein the seal body and the spring member together define a unitary structure.

8. The seal assembly of claim 1, wherein the cavity is defined radially outward, radially inward, or both, relative to the fluid passage at the seal body.

9. The seal assembly of claim 8, wherein the seal body comprises a plurality of ribs extended through the cavity.

10. The seal assembly of claim 9, wherein the plurality of ribs is integrally attached to the seal body between a first portion of the seal body extended opposite of a second portion of the seal body.

11. The seal assembly of claim 9, wherein the plurality of ribs comprises an axial rib extended co-directional to the centerline axis.

12. The seal assembly of claim 9, wherein the plurality of ribs comprises a radial rib extended perpendicular or oblique to the centerline axis.

13. A turbo machine, the turbo machine comprising:
    a rotor assembly rotatable relative to a centerline axis, wherein the rotor assembly comprises a rotor face extended radially and circumferentially relative to the centerline axis;
    a stator structure adjacent to the rotor assembly; and
    a seal assembly attached to the stator structure, wherein the seal assembly comprises:
        a fluid bearing wall comprising a bearing face, wherein the bearing face and the rotor face together define a bearing fluid passage therebetween, and wherein the bearing face defines a fluid opening through the fluid bearing wall in fluid communication with the bearing fluid passage;
        a seal body extended circumferentially relative the centerline axis, wherein the seal body defines a cavity extended at least partially circumferentially through the seal body; and
        a spring member attached to the seal body and the fluid bearing wall, wherein a fluid passage is defined through the spring member and the fluid bearing wall in fluid communication with the fluid opening at the fluid bearing wall.

14. The turbo machine of claim 13, wherein the fluid opening at the fluid bearing wall defines a first cross sectional area directly adjacent to the bearing fluid passage, and wherein the fluid passage through at least the spring member defines a second cross sectional area different from the first cross sectional area at the fluid bearing wall.

15. The turbo machine of claim 14, wherein the second cross sectional area is greater than the first cross sectional area.

16. The turbo machine of claim 15, wherein a ratio of the second cross sectional area at the fluid passage to the first cross sectional area at the fluid opening is between 1.1:1 and 3:1.

17. The turbo machine of claim 13, wherein the seal body of the seal assembly is integrally formed with the stator structure, and wherein the seal body and the stator structure together define a unitary structure.

18. The turbo machine of claim 17, wherein the seal body is integrally formed with the spring member, and wherein the seal body and the spring member together define a unitary structure.

19. The turbo machine of claim 13, wherein the cavity is defined radially outward, radially inward, or both, relative to the fluid passage at the seal body.

20. The turbo machine of claim 19, wherein the seal body comprises a plurality of ribs attached to the seal body and extended through the cavity.

\* \* \* \* \*